Figure 1:
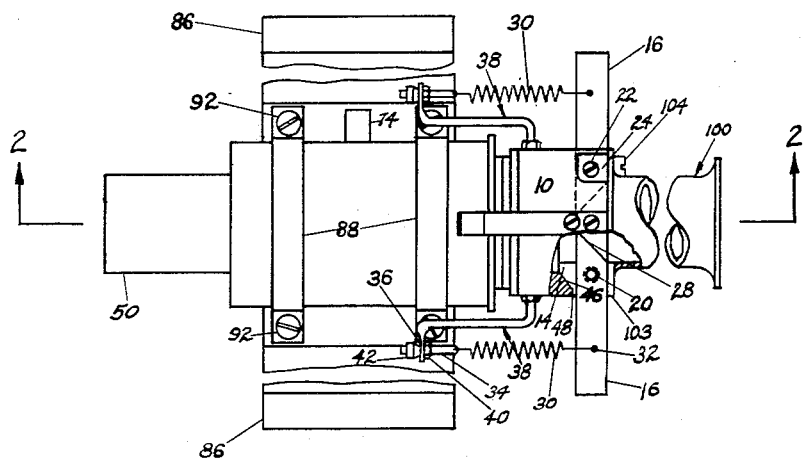

Feb. 22, 1955     H. E. RUFENACH     2,702,404

APPARATUS FOR TREATING SAUSAGES

Filed Oct. 28, 1952     2 Sheets-Sheet 1

Inventor
Harold E. Rufenach
By Harry H. Levin
Attorney

United States Patent Office

2,702,404
Patented Feb. 22, 1955

2,702,404

APPARATUS FOR TREATING SAUSAGES

Harold E. Rufenach, Edmonton, Alberta, Canada, assignor to Gainers Limited, South Edmonton, Alberta, Canada, a corporation of Alberta Application October 28, 1952, Serial No. 317,260

5 Claims. (Cl. 17—1)

This invention relates to the art of peeling casings from sausages. More particularly, it relates to a new and novel apparatus for treating frozen pork sausage so that the casing can be easily and expeditiously peeled.

Frozen pork sausage, without any casing, was recently introduced on the market. In producing such sausage, the meat emulsion was stuffed into an appropriate cellulose sausage casing, such as sold under the trade-mark "NoJax," and after linking the stuffed casing into the desired lengths the linked sausages were subjected to refrigeration whereby they were frozen to a firm, rigid mass. While in the frozen state, the casings were peeled and the resulting sausages were then packaged and kept under refrigeration by the sausage maker and the retailer who had purchased them for resale. The ultimate consumer, likewise, kept such sausages under refrigeration until ready for cooking.

The peeling operation was performed manually by an operator who, with a knife or other suitable tool, formed a tab in the casing and stripped the casing by pulling the tab with a spiral motion. Though this operation satisfactorily peeled the casing it, however, was rather slow and tedious.

An object of this invention is to provide an apparatus for treating the casing while on the sausage to permit rapid and expeditious peeling thereof.

Another object of this invention is to provide an apparatus to preliminarily treat the casing on the sausage so that it can be peeled without the use of any extraneous tool.

An additional object of this invention is to provide an apparatus to prepare the casing of the sausage so that it can be peeled by shelling.

A still further object of this invention is to provide a simple and economical apparatus for treating the casing of frozen pork sausage so that it can be peeled by shelling.

Other and additional objects will become apparent hereinafter.

The above objects are accomplished, in general, by cutting the casings of the frozen pork sausage, without substantially scoring the meat mass, along a plurality of substantially equidistantly spaced longitudinal lines beginning and terminating, respectively, in close vicinity to the tie at each end of the sausage and substantially immediately thereafter humidifying the cellulose casing and softening the surface of the meat mass contacting the casing whereby the casing is loosened from the meat mass and is easily and expeditiously peeled by shelling, i. e., grasping the links at the tie ends and then applying pressure together with a slight squeezing and twisting motion, whereupon the sausage will pop out of the casing.

The cutting of the casing is obtained by passing the frozen sausage between the cutting edges of equidistantly spaced pivotally mounted knives maintained under tension sufficient to cut the casing without appreciably scoring the meat mass. In the preferred embodiment of the invention, the knives are carried by a knife holder having a central passage into which the cutting edges of the knives extend and through which the sausages are fed. Means are also provided to maintain the knives under the necessary and desired tension. Means are also provided to limit the movement of each of said knives about its pivot. Normally, the knives are positioned so that they will begin and terminate the cutting of the casing on the respective shoulder of the sausage close to the ties. Herein the term "shoulder" defines the curved end portion of a sausage. When the sausage has a casing thereon, the portion thereof on the shoulder terminates in a tie or twist.

The humidification of the cut casing, as well as loosening it from the frozen meat mass and softening the meat surface in contact with the casing is obtained by subjecting the sausage for a relatively short period of time, immediately after it passes through the zone of action of the cutting knives, to steam. In one form of the invention, this operation is performed by passing the sausage with the cut casing through a tube in which steam, preferably in a turbulent state, is supplied. Means are provided to supply and produce the turbulent steam to which the sausages are subjected.

In the preferred embodiment of the invention, the knife holder and the tube containing their turbulent steam are removably secured together with their respective center axes in alignment and the assembly is secured to an appropriate stand which, in turn, can be secured to a table or other support. The knife holder is also provided with an entrance guard so that the operator will be protected from the knives and guide the sausage into proper position between the knives.

Figure 2:
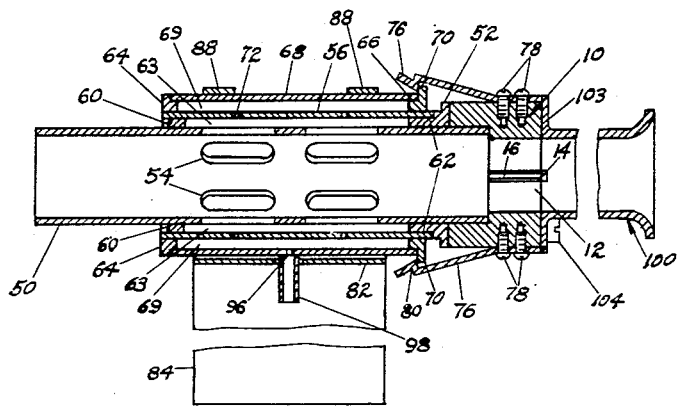
Figure 3:
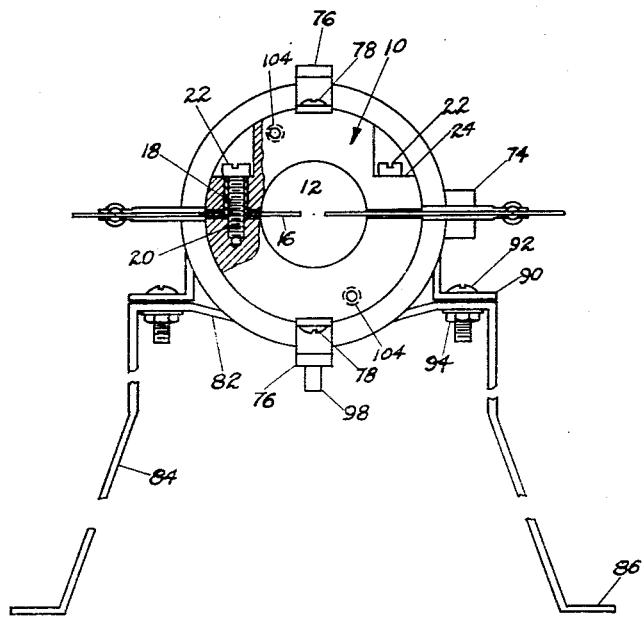

The invention will be more clearly understood by reference to the following detailed description when taken in connection with the accompanying drawings, and wherein Figure 1 is a top plan view, partly in section, of one embodiment of an apparatus embodying the principles of the invention, Figure 2 is a section taken on lines 2—2 of Figure 1, and Figure 3 is an end view, partly in section, of the apparatus shown in Figure 1 and looking to the left with the entrance guard removed.

Referring now to the drawings wherein like reference numerals designate like parts, the reference numeral 10 designates a knife holder having a central passage 12 circular in cross section. The knife holder is also provided with a pair of oppositely disposed slots 14 which communicate with passage 12 and in each of which a knife 16 is pivotally mounted. As shown in Figure 3, each knife 16 is provided with a hole whereby it is pivotally mounted on bushing 18, the lower end of which extends through and terminates at the lower wall of slot 14. A screw 20, the shank of which extends through bushing 18 and has its head 22 in contact with the top edge of bushing 18 and its opposite end terminating in a threaded hole in the holder 10 below the slot secures the bushing 18 in position. The knife holder 10 is appropriately machined to provide flat seats 24 for the heads 22 of screws 20.

Referring now to Figure 1, each knife 16 is formed with an angular cutting edge 28 and the knives 16 are positioned so that such cutting edges 28 are in passage 12 and converge in the direction of travel of the sausage fed therebetween. The opposite apices of cutting edges 28 are normally spaced from each other, the distance therebetween being such that when a sausage is fed therebetween, the cutting of the casing will begin and terminate on the opposite shoulders of the sausage in close vicinity to the ties. As the sausage travels between knives 16 due to the pivotal mounting thereof they will accommodate themselves to the diameter of the sausage engaged therebetween.

The depth of the cuts made by cutting edges 28 depend upon the tension under which knives 16 are during the cutting action. Inasmuch as it is desired to cut only the casing, means are provided to apply such tension to each knife 16 as will accomplish this result. In the form shown, tension is applied to each knife 16 by spring 30, one end of which is secured to knife 16 as at 32. The other end of spring 30 is secured to threaded shank 34 which extends through a hole in arm 36 at one end of a support 38 rigidly secured at its other end in any appropriate manner to knife holder 10. By this construction shank 34 is adjustable, relative to arm 36, in a direction toward or away from the respective knife 16. Consequently, the tension to be applied by spring 30 to the respective knife can be adjusted. Lock nut 40 and knurled nut 42 secure shank 34 against movement in any adjusted position. When the tension on either of knives 16 requires adjustment, lock nut 40 is rotated in a direction to move away from arm 36 and then knurled nut 42 is rotated in the direction to permit the required movement of shank 34 necessary to impose the desired tension on spring 30 cooperating with said knife. When the desired tension is obtained, lock nut 40 is screwed home.

The tension necessary to be applied to knives 16 for properly carrying out the cutting operation can be determined by simple empirical tests.

Each of slots 14 is so shaped that movement of the knife 16 about its pivot will be limited. As shown in Figure 1, rear wall 46 of each slot 14 is angularly disposed relative to the longitudinal center axis of the knife's normal position whereby knives 16 will be maintained in normal position and movement thereof in either direction about their respective pivots will be limited. As shown in Figure 1, wall 46 limits the movement of knife 16 in the direction which increases the distance between the knife edges 28 while the forward end 48 of wall 46 limits movement of the knife in the opposite direction beyond that required to maintain the knives in normal position.

Knife holder 10 is provided with a recess in which one end of center guide tube 50 is seated as shown in Figure 2. Center guide tube 50 is provided with a ring flange 52, the front face of which is designed to abut the rear face of knife holder 10. For reasons which will become apparent hereinafter, the wall of guide tube 50 is provided in the center portion thereof with two circumferential rows of slots 54, the slots in each row being spaced equidistantly around the periphery thereof. Center guide tube 50 is positioned in and in spaced relation to jacketed hollow cylinder 56. In the embodiment which now will be described, hollow cylinder 56 is of such length that it extends beyond the outer ends of slots 54 so that said slots will be within it and the opposite ends of tube 50 will extend beyond the respective ends thereof.

Hollow cylinder 56 is secured at one end to ring flange 60 on tube 50 and the opposite end thereof secured on seat 62 of flange 52 to provide an annular chamber 63, between tube 50 and cylinder 56, closed at both ends thereof. End closures 64 and 66 secure cylinder 56 in spaced relation to jacket 68 to provide an annular chamber 69 between cylinder 56 and jacket 68 which is closed at both ends. For reasons which will become apparent, end closure 66 is provided with flange 70.

Hollow cylinder 56 is provided with two circumferential rows of small orifices 72, the orifices in each row being spaced equidistantly around the periphery. Orifices 72 are substantially smaller in size (area) than slots 54 and are arranged so that wherever possible they will be staggered relative to said slots.

Jacket 68 is provided with inlet 74 (see Figure 1) which is connected to a suitable source of steam (not shown). Steam supplied through inlet 74 will enter into chamber 69 and thence pass through orifices 72 into chamber 63 between cylinder 56 and guide tube 50, from whence it will pass through slots 54 into tube 50. Because of the dimensions of the steam inlet 74, the size of the orifices 72 and the slots 54, as well as the arrangement of said orifices and slots, the steam in tube 50 will be in a turbulent state. Because tube 50 is open at both ends thereof some steam may pass from one end thereof into passage 12 and from the other to the atmosphere.

Clip 76 having one end secured as by screws 78 to knife holder 10 and the other end being provided with detent 80 cooperating with flange 70, lock and securely maintain knife holder 10 and tube 50 in the position shown in Figures 1 and 2. Upon releasing detent 80 from the flange 70, knife holder 10, together with knives 16 carried thereby can be movably separated from tube 50 and the elements carried thereby.

The assembly is carried on saddle 82 of stand 84 having feet 86 which can be secured in any appropriate manner to any suitable support. A pair of clamps 88 with their respective opposite legs 90 removably secured by bolts 92 and nuts 94 to saddle 82, serve to lock the apparatus to the stand.

Jacket 68 is provided with an orifice 96 which is connected to a suitable drain 98, whereby condensate may pass from the apparatus.

A guard 100 flared at the delivery end as shown by the reference numeral 102 is secured to the front face of the knife holder in any appropriate manner. In the form shown, guard 100 is provided with a flange 103 which by means of screws 104 cooperating with threaded holes 106 in the front face of said knife holder is secured thereto. This guard not only protects the operator from the knives but also aids in guiding the sausage into and through the zone of action thereof.

The inner diameter of entrance guard 100 and the diameter of the passage 12 in which knives 16 are positioned are substantially the same and of a size to permit a sausage to be passed therethrough with slight clearance so that the knives will cut the casing as previously described. The inner diameter of the tube 50 is slightly larger than that of the sausage undergoing treatment, so that the steam will be able to readily contact the entire peripheral wall of the casing on the sausage and passage therethrough will be easy. The dimensions of the steam inlet 74, orifices 72 and slots 54 as well as the arrangement thereof are such as to provide steam in a turbulent state in the interior of tube 50.

In an apparatus such as shown in the drawings and designed for use in peeling pork sausage $2\tfrac{2}{32}''$ to $2\tfrac{7}{32}''$ in diameter, the cylinder 56 is provided with two rows of orifices, each orifice $\tfrac{1}{32}''$ in diameter and each row containing four orifices spaced equidistantly about the peripheral wall of the cylinder, and center tube 50 is provided with two rows of slots, each slot being $1\tfrac{1}{8}'' \times \tfrac{1}{4}''$ and each row containing six slots spaced equidistantly around the peripheral wall of the tube. In operation of such apparatus, the tensions on the knives 16 are adjusted so that they will cut the cellulose casing of the frozen pork sausage, without substantially scoring the surface of the meat mass, along two opposite lines beginning and terminating on the respective opposite shoulders of each link and preferably in close vicinity to the tie. Steam at a line pressure of 5 to 15 pounds per square inch (gauge pressure) is supplied to the jacketed chamber 69 through inlet 74. From such chamber the steam passes through the orifices 72 into chamber 63 and thence through the slots 54 into the interior of the center tube 50 where it is in a turbulent state. Links of pork sausage which have been frozen and have an internal temperature of 10° to 15° F. are pushed successively through the entrance guard 100, between the cutting edges 28, into and through the center guide tube 50 at such a speed that the internal temperature of the sausage leaving the apparatus is approximately 20° to 27° F. Promptly upon exit from the apparatus the links are grasped at the tie ends and then upon applying pressure together with a squeezing and twisting motion the sausage will pop from the casings. The peeled sausages are then placed in a normal holding cooler.

The frozen meat mass resists the action of the knives which cut the casing, and if any slight scoring of the meat mass results, they will disappear when the sausage is brought to normal holding cooling temperature. It is essential that the links be pushed through the apparatus from the feed end. If the links were pulled through the apparatus by force applied at the exit end, the casings, being weakened by the humidification, would break frequently and interfere with the operation.

Upon the release of the detent 80 from flange 70, knife holder 10, together with the knives 16 carried thereby, may be separated from the center tube 50 and the elements carried thereby. By removing the appropriate screw 20 and detaching the respective end of spring 30, any knife 16 may be removed and replaced. If desired, end pieces 64 and 66 may be attached to jacket 68 and also be provided with threads cooperating with internal threads on the hollow cylinder 56 whereby jacket 68 and cylinder 56 can be separated by gripping flange 70 and rotating it together with jacket 68 in the proper direction.

The use of two oppositely disposed knives has given satisfactory results. However, any number of knives may be used, depending on the diameter of the sausage to be treated. When a plurality of knives, such as three, four or more are used they should be spaced equidistantly about the center passage of the knife holder.

The means for applying tension to the knives and also the means limiting the movement of each knife about its pivot are not restricted to those hereinbefore described. Any other suitable means for limiting the movement of each knife about its pivot as well as any other appropriate means for imposing a tension on each knife can be used.

In any embodiment the knives are adjusted so that they will begin and terminate the cutting of the casing along lines beginning and terminating at least on the respective shoulders of each link. Preferably the cuts should begin and terminate in close vicinity to the tie.

The invention is not limited to the precise number, dimensions and arrangement of orifices 72 and slots 54, respectively. Any size, number and arrangement of orifices 72 and slots 54, respectively, which will serve to baffle the steam in its passage from the inlet 74 to the interior of the center tube 50, can be used. There must be at least one row of orifices and slots, but any number of rows can be used. Preferably, the number, size, and arrangement of the orifices 72 and slots 54 should be such as will also cause the steam fed into the center tube 50 to be in a turbulent state so that it will more readily contact the entire peripheral wall of the casing.

The time of exposure of the frozen sausage to the action of the steam depends on the temperature of the sausage, the diameter of the sausage, the rate of feed through the apparatus and the temperature of the steam. These factors must be correlated so that the time of exposure will be sufficient to humidify the casing and soften, but not cook or melt to a fluid state, the surface of the meat mass in contact with the casing. If the surface of the meat mass were rendered fluid, poor peeling and a product having a distorted surface would be obtained. In general, satisfactory peeling of frozen fresh pork sausage is obtained when the following conditions are observed:

Internal temperature of sausage to be treated. — Not above 18° F.
Internal temperature of treated product. — Not above 28° F.
Line pressure of steam — 5–15 p. s. i. gauge pressure.

Though the invention is admirably suited for treating frozen pork sausage, it is not restricted thereto. It can be used for the treatment of any frozen product encased in a cellulose casing, the conditions for satisfactory performance being determined by simple experiments.

Since it is obvious that various changes and modifications may be made in the above description without departing from the nature and spirit thereof, this invention is not restricted thereto except as set forth in the appended claims.

I claim:

1. An apparatus comprising a knife holder having a central passage through which a frozen pork sausage encased in a cellulose casing is to be passed, a plurality of equidistantly spaced knives pivotally mounted in said holder with their cutting edges disposed in spaced relation to each other in said passage to cut the casing of the sausage passing therebetween, means to maintain said knives under tension sufficient to cut the casing without substantially scoring the meat mass, a center guide tube, means attaching said knife holder to one end of said tube with their longitudinal center axes in alignment whereby a sausage passing from the zone of action of said knives will directly enter said tube, and means to supply steam to the interior of said tube.

2. An apparatus comprising a knife holder having a central passage through which a frozen pork sausage encased in cellulose casing is to be passed, a plurality of equidistantly spaced knives pivotally mounted in said holder with their cutting edges disposed in spaced relation to each other in said passage to cut the casing of the sausage passing therebetween, means limiting the movement of each of said knives about its pivot, means to maintain said knives under tension sufficient to cut the casing without substantially scoring the meat mass, a center guide tube, means attaching said knife holder to one end of said tube with their longitudinal center axes in alignment whereby a sausage passing from the zone of action of said knives will directly enter said tube, and means to supply steam to the interior of said tube.

3. An apparatus comprising a knife holder having a central passage through which a frozen pork sausage encased in cellulose casing is to be passed and a plurality of slots spaced equidistantly about said central passage, a knife pivotally mounted in each of said slots, said knives having their cutting edges disposed in spaced relation to each other in said passage to cut the casing of the sausage passing therebetween, means to maintain said knives under tension sufficient to cut the casing without substantially scoring the meat mass, a center guide tube, means attaching said knife holder to one end of said tube with their longitudinal center axes in alignment whereby a sausage passing from the zone of action of said knives will directly enter said tube, and means to supply steam to the interior of said center tube.

4. An apparatus comprising a knife holder having a central passage through which a frozen pork sausage encased in cellulose casing is to be passed and a plurality of slots spaced equidistantly about said central passage, a knife pivotally mounted in each of said slots, said knives having their cutting edges disposed in spaced relation to each other in said passage to cut the casing of the sausage passing therebetween, means to maintain said knives under tension sufficient to cut the casing without substantially scoring the meat mass, means limiting movement of each knife about its pivot, a center guide tube, means attaching said knife holder to one end of said tube with their longitudinal center axes in alignment whereby a sausage passing from the zone of action of said knives will directly enter said tube, and means to supply steam to the interior of said center tube.

5. An apparatus comprising a knife holder having a central passage through which a frozen pork sausage encased in cellulose casing is to be passed and a plurality of slots spaced equidistantly about said central passage, a knife pivotally mounted in each of said slots, said knives having their cutting edges disposed in spaced relation to each other in said passage to cut the casing of the sausage passing therebetween, means to maintain said knives under tension sufficient to cut the casing without substantially scoring the meat mass, a center guide tube, means attaching said knife holder to one end of said tube with their longitudinal center axes in alignment whereby a sausage passing from the zone of action of said knives will directly enter said tube, the wall of said guide tube having at least one circumferential row of slots spaced equidistantly in the center portion of the periphery thereof, a jacketed hollow cylinder in which at least the portion of said guide tube having said slots is disposed in spaced relationship thereto, said cylinder having at least one circumferential row of orifices spaced equidistantly in its peripheral wall, and means in the jacket adapted to be connected to a steam supply.

References Cited in the file of this patent

UNITED STATES PATENTS

| | | |
|---|---|---|
| 1,165,176 | Hornor | Dec. 21, 1915 |
| 1,520,031 | Lucas | Dec. 23, 1924 |
| 1,938,070 | Friedler | Dec. 5, 1933 |
| 2,120,398 | Edwards et al. | June 14, 1938 |
| 2,178,787 | Gorton, Jr. | Nov. 7, 1939 |
| 2,369,360 | Martin | Feb. 13, 1945 |
| 2,463,157 | Deitrickson | Mar. 1, 1949 |
| 2,538,453 | Harkins | Jan. 16, 1951 |
| 2,630,598 | Grey | Mar. 10, 1953 |

FOREIGN PATENTS

| | | |
|---|---|---|
| 525,691 | Great Britain | Sept. 3, 1940 |